United States Patent [19]

Trelford

[11] Patent Number: 4,574,568
[45] Date of Patent: Mar. 11, 1986

[54] COLLECTING BOX FOR A GARDEN TOOL

[75] Inventor: Alan Trelford, Mytchett, England

[73] Assignee: Black & Decker, Newark, Del.

[21] Appl. No.: 644,986

[22] Filed: Aug. 28, 1984

[30] Foreign Application Priority Data

Sep. 1, 1983 [GB] United Kingdom ............... 8323420

[51] Int. Cl.⁴ ............................................ A01D 34/12
[52] U.S. Cl. ......................................... 56/202; 56/16.6
[58] Field of Search ....................... 56/16.6, 202, 203; 248/99, 101

[56] References Cited

U.S. PATENT DOCUMENTS

| 157,978 | 12/1874 | Strong et al. ...................... 182/138 |
| 3,176,453 | 4/1965 | Booher et al. ...................... 56/202 |
| 4,047,368 | 9/1977 | Peterson .............................. 56/202 |
| 4,151,702 | 5/1979 | Brown ................................ 56/16.6 |
| 4,262,475 | 4/1981 | Takahashi et al. ................. 56/202 |

Primary Examiner—Robert P. Swiatek
Assistant Examiner—David I. Tarnoff
Attorney, Agent, or Firm—Ronald B. Sherer; Edward D. Murphy; Harold Weinstein

[57] ABSTRACT

A collecting box for collecting debris from a garden tool, for example a lawn mower or a lawn raker, has a lightweight, self-supporting collecting box body and, on each side of the body, a tubular fastening member for fastening the collecting box to the garden tool. The fastening members extend at least one third of the way along the sides of the body with a view to preventing the body being subjected to high stresses, and the ends of the fastening members project from the body and can be inserted into sockets in the tool. An intermediate length of each fastening member is exposed to provide a handle for carrying the box.

20 Claims, 9 Drawing Figures

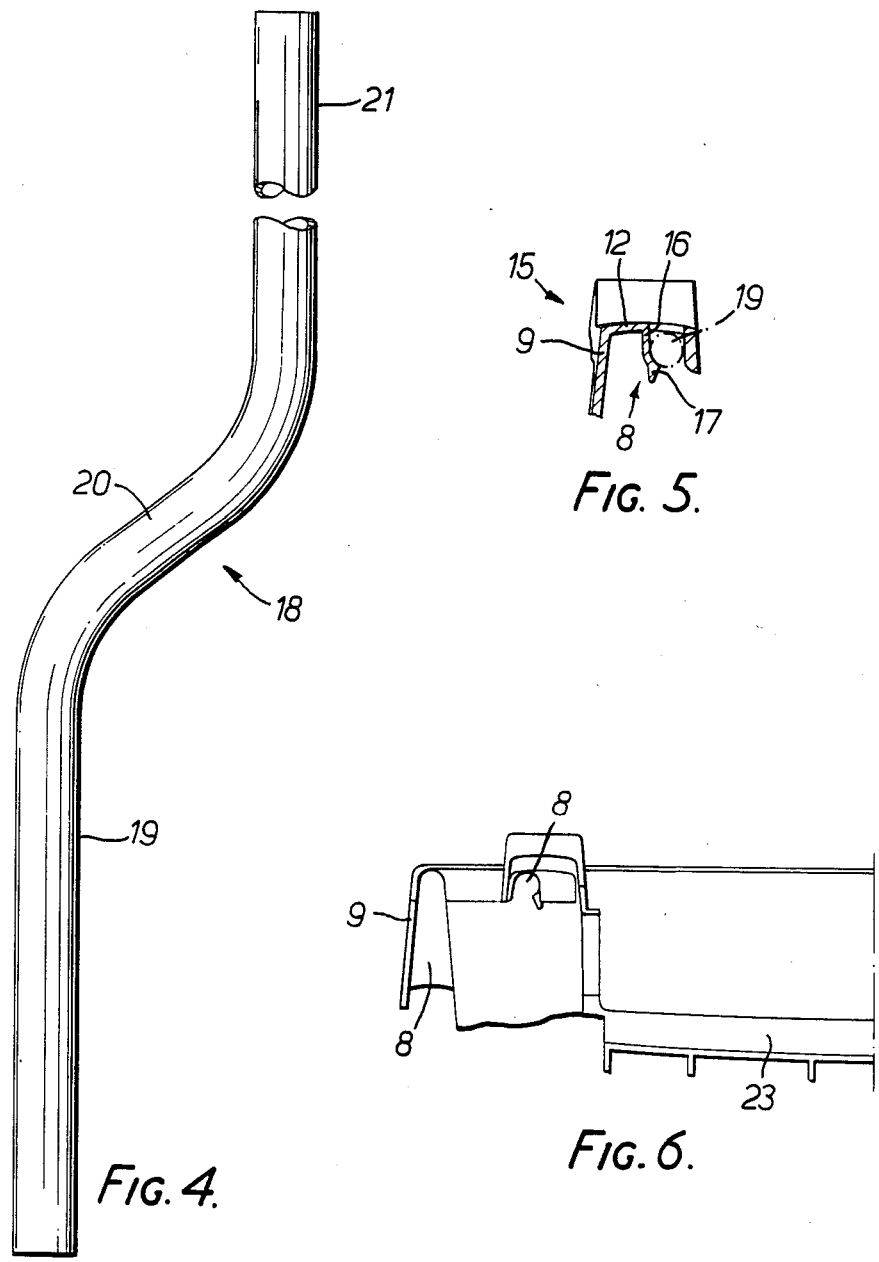

COLLECTING BOX FOR A GARDEN TOOL

BACKGROUND OF THE INVENTION

1. Field of the invention

This invention relates to a collecting box for a lawn mower or lawn raker or for other garden tools which collect material.

2. Brief description of the prior art

Traditionally grass boxes have been made of metal or wood or a combination thereof, but a problem that arises with such boxes is that they are unduly heavy and expensive.

It is known to provide a grass box for a mower consisting of a pervious sack suspended from a metal frame. A typical example of this kind of box is shown in British patent application No. 2 066 033A in the name of MTD Products Inc. Such an arrangement is lighter and cheaper than the traditional box mentioned above but it does not provide a self-supporting box and this can be disadvantageous to the user.

It is also known to make a grass box in one piece by moulding from plastics material. Such a box can be lightweight and inexpensive but it has been found that in the region of the box that is secured to the mower where high stresses occur the plastics material is liable to fail. This may also occur in the region where the box is gripped by a user.

A further difficulty experienced with conventional grass box designs is that the grass box may not be very easy for a user to grip, either while carrying the box or while taking it off a mower.

SUMMARY OF THE INVENTION

It is an object of the invention to provide an improved form of collecting box for a garden tool.

According to the invention there is provided a collecting box for a garden tool in which the body of the box is self-supporting, and at least one fastening member is attached or attachable to the collecting box body, the member including means for fastening an end of the box to the tool and, when attached, extending to at least one third of the way back to the other end of the box.

With this arrangement the box body can be lightweight and the advantages of a moulded plastics collecting box may be achieved but no part of the body material need be subjected to high stresses since these may be concentrated in the fastening member(s).

Preferably a pair of fastening members are provided, one on each side of the box body. The fastening members may extend along the sides of the collecting box body and channels may be provided on the sides of the collecting box body to receive the fastening members. Preferably the fastening members extend at least two thirds of the way along the tops of the sides of the collecting box body. This ensures that the load taken by the collecting box body may be transmitted evenly to the fastening members and vice versa.

The or each fastening member may be made of metal, for example aluminium, and may be in the form of a tube which may be cranked. When attached to a collecting box body, an end of the tube may project from the body for fastening the box to the tool. To this end, the tool may be provided with a socket into which the projecting end of the tube is inserted. Where there are a pair of fastening members in the form of tubes, on each side of the body, the tool may be provided with a pair of sockets, one on each side of the tool body, for receiving the projecting ends of the tubes. The end of the box that is fastened to the tool may be an open, or collecting, end of the box, the other end of the box being closed.

According to another aspect of the invention there is provided a collecting box for a garden tool in which the body of the box is self-supporting, and at least one frame member is located in a channel of the box body, the channel of the box body being interrupted or diverted between its ends to provide a free space around the frame member allowing the frame member to be gripped as a handle.

It should be understood that the frame member of this second aspect of the invention may be the fastening member of the first aspect of the invention. In particular, the frame member may be made of metal, and may be in the form of a cranked tube, and may then be the fastening member of the first aspect of the invention.

When the frame/fastening member is in the form of a tube, the channel of the box body in which the member is located may include a clip releasably engageable with the tube to retain it in the channel. The clip may be moulded integrally with the box body. A flange may extend around the top of the side and back walls of the box body and part of this flange may form the channel(s).

BRIEF DESCRIPTION OF THE DRAWINGS

By way of example an embodiment of the invention will now be described with reference to the accompanying drawings of which:

FIG. 4 is a plan view of one of a pair of fastening members for use with the collecting box body;

FIG. 5 is a sectional view along the lines V—V of FIG. 2 of part of the collecting box body;

FIG. 6 is a view in the direction of the arrow Y of FIG. 2;

DETAILED DESCRIPTION OF THE PREFERRED EMBODIMENTS OF THE INVENTION

Figure 1:
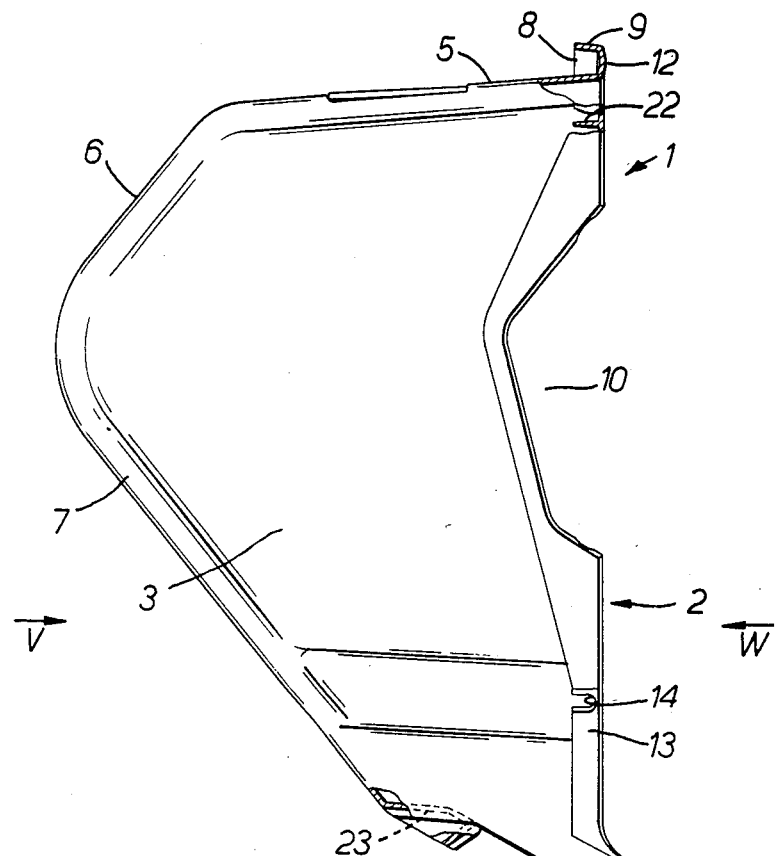
FIG. 1 is a side view of the collecting box body.
Figure 3:
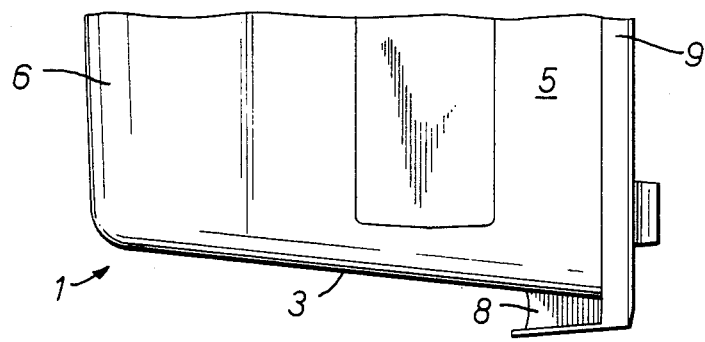
FIG. 3 is a plan view of part of the collecting box.

Referring first to FIG. 1 the collecting box body 1 shown is moulded in one piece from plastics material, for example polypropylene. The right hand end 2 (as seen in FIG. 1) is open while the sides 3 of which only one can be seen in FIG. 1, and the top wall 5, end wall 6 and bottom wall 7 are all substantially closed.

Referring now to all of FIGS. 1 to 6 except FIG. 4, a channel 8, formed by a wall 12 and a peripheral flange 9, extends around the top of the sides 3,4 and the top wall 5. This flange strengthens the box body 1 and also provides a convenient way for a user to get hold of the box.

Figure 2:
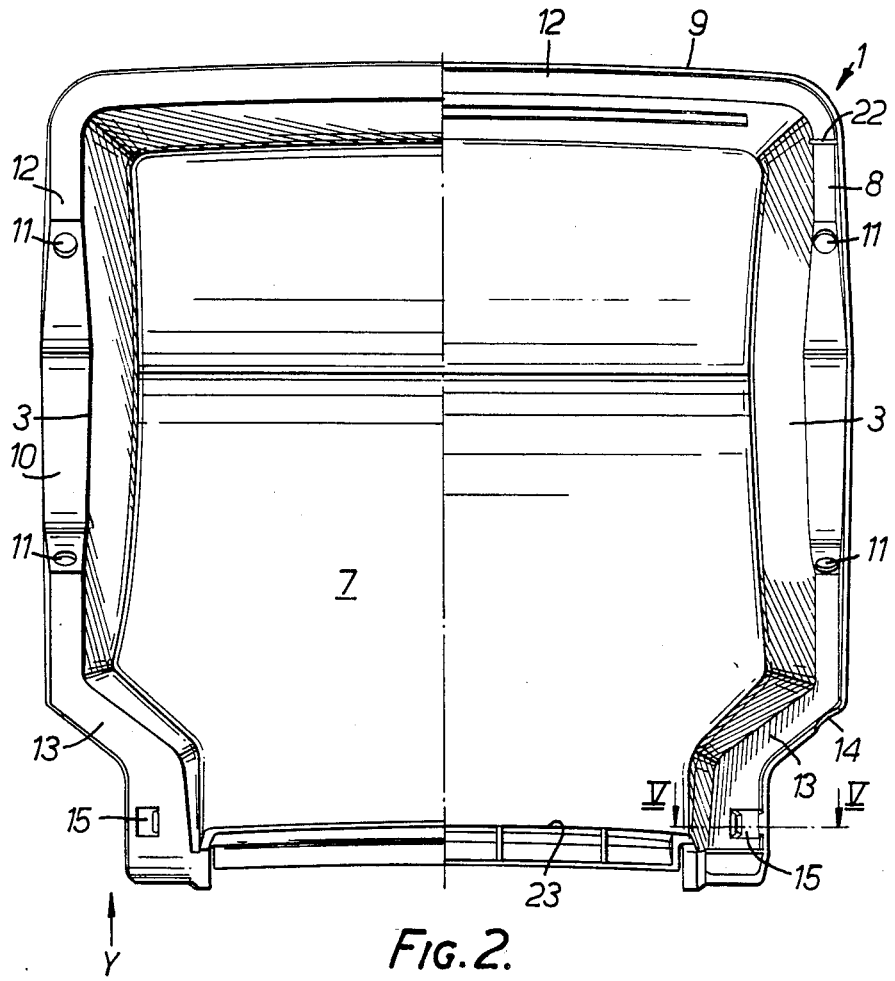
FIG. 2 is a view, on the left hand side, in the direction of the arrow W of FIG. 1 and on the right hand side in the direction of the arrow V of FIG. 1.

As most clearly seen in FIGS. 1 and 2 the channel 8 is diverted partway along each of the sides 3 and 4 and in this region recesses 10 are provided in the sides with the diverted channel defining the boundary of the recesses. Holes 11 are provided in the wall 12 of the channel at each point where it is diverted with the result that clear straight passages are provided between the channel portions on opposite sides of the recesses 10.

The channel 8 is cranked inwardly at each of its bottom ends, the cranked portions being designated by numeral 13 in the drawings. Where the channel turns inwardly openings 14 are provided in the peripheral flange 9 these openings being aligned again with the straight passages mentioned above.

The bottom end portions of the channel 8 each include an integral clip 15 most clearly seen in FIG. 5. Each clip comprises a resilient arm 16 formed with a protuberance 17.

The collecting box includes, in addition to the body 1 a pair of identical tubes 18 one of which is shown in FIG. 4. Each tube 18 is made for example of aluminium and is of cranked form having a short end 19, a cranked portion 20 and a long end 21. These tubes are attachable to the body 1 by location in the channel 8 as will now be described.

Figure 9:
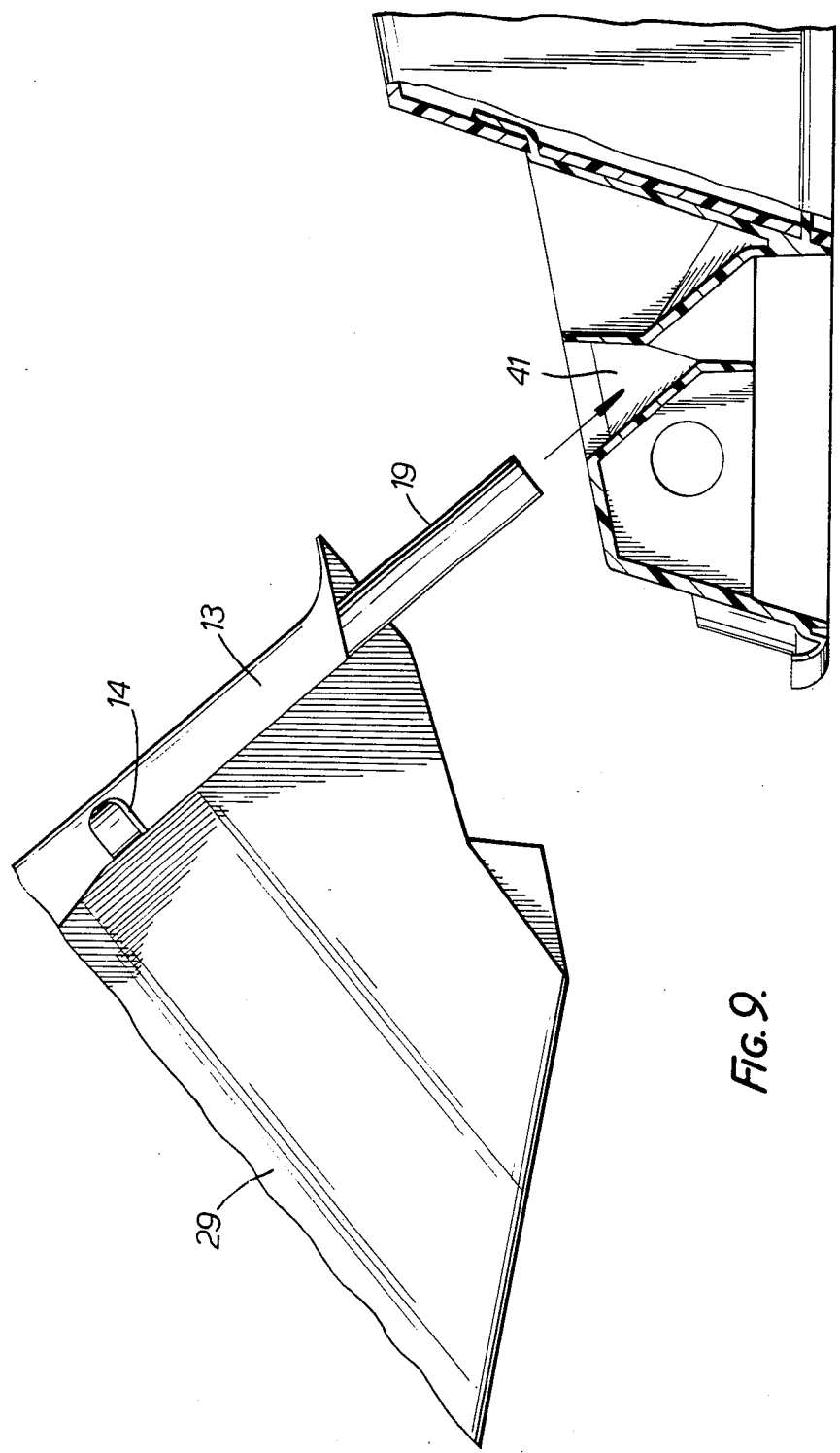

The long end 21 of a tube 18 is inserted through one of the openings 14 into the straight passage mentioned above; this long end of the tube is then pushed through the passage and through the holes 11 until the end of the tube meets a transverse wall 22 formed in the channel 8 adjacent the top of the channel. The tube 18 is then rotated about the axis of the long end 21 bringing the cranked portion 20 of the tube into the cranked portion 13 of the channel 8 and a portion of the short end 19 into the bottom end portion of the channel 8. As short end 19 enters the channel 8 it engages the protuberance 17 and deflects the arm 16 outwardly; after insertion the arm 16 returns to its unstressed position and the end 19 is located as shown in dotted outline in FIG. 5. During this rotation of the tube, it is drawn back slightly away from the transverse wall 22. Once located, the short end 19 of the tube projects beyond the channel 8 by a short distance, for example 5 cm, as can be seen from FIG. 9. The other tube is of course inserted along the other side of the box in the same way.

The projecting ends of the tubes 18 are used to mount the collecting box on the tool with which it is to be used, for example a mower or scarifier. For this purpose the tool may be provided with sockets into which the projecting ends of the tubes 18 can be inserted, as will be described below with reference to FIGS. 7 to 9.

Figure 7:
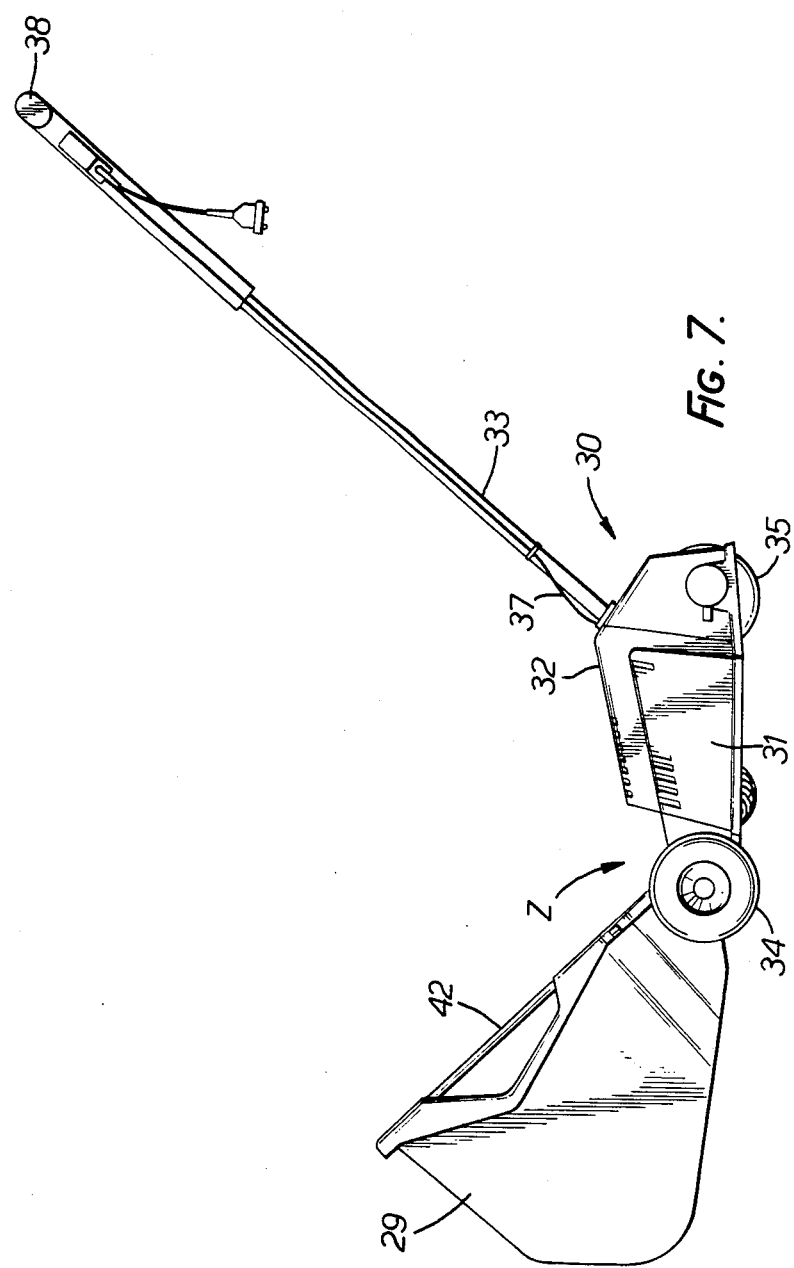
FIG. 7 is a side view of a garden tool incorporating the collecting box of FIGS. 1 to 6.
Figure 8:
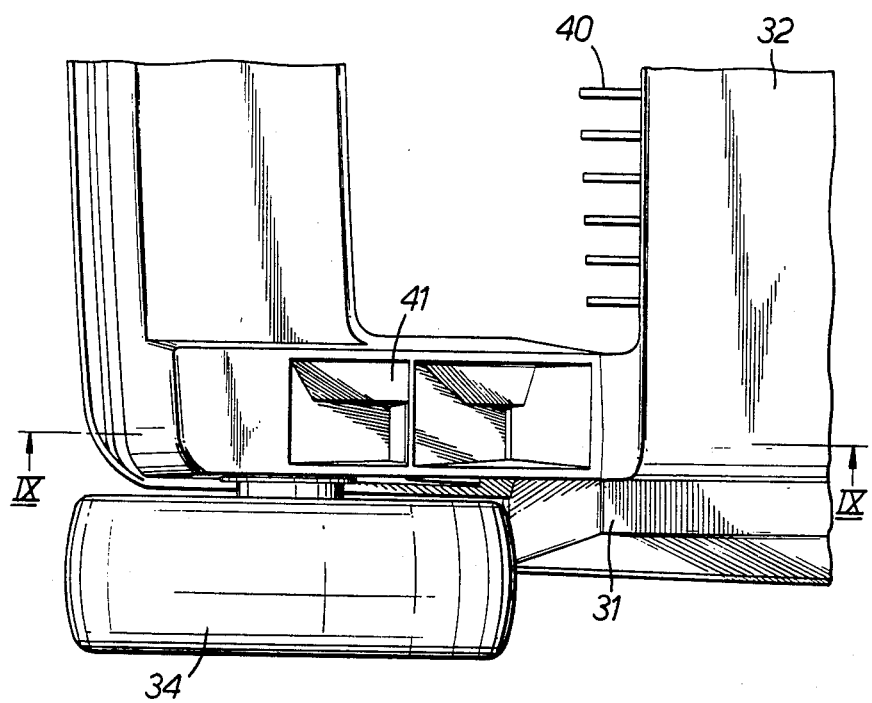
FIG. 8 is a view in the direction of the arrow Z in FIG. 7 of a portion of the front of the tool body with the collecting box removed; and, FIG. 9 is a sectional view along the line IX—IX of FIG. 8 and includes a side view of a portion of the collecting box which is being mounted on the tool.

FIG. 7 shows by way of example, the collecting box 29 mounted on a scarifier. The scarifier has a body 30 which may be of a plastics material and which has side walls 31 and a top wall 32 in which is mounted a handle 33. The body is mounted for movement on wheels 34 and a roller 35 located at the front and rear respectively of the body. A tine assembly is located towards the front of the body and in front of this is the collecting box 29. The tine assembly does not appear in FIG. 7 but the location of the assembly is indicated by the arrow Z. The tine assembly may be described in U K Patent Specification No. 2112613 A and has a central portion through which passes an axle parallel to the axles of the wheels and roller 34,35 and from which extend a plurality of tine arms 40 (the ends of some of which appear in FIG. 8). An electric motor is located beneath the top wall and is powered via a power lead 37, under the control of a switch operated by a trigger (not shown) on a crosspiece 38 of the tool handle. In use, the motor rotates the axle of the tine assembly and, as the scarifier is moved across a grassed area, the tine arms 40 of the tine assembly rake the grass and remove moss and surface debris (for example, grass cuttings and leaves) and project them into the box 29.

As already mentioned, the collecting box 29 is mounted on the scarifier by inserting the projecting ends of the tubes 18 (FIG. 9) into sockets provided for this purpose on the tool. These sockets are indicated at 41 in FIGS. 8 and 9 and are formed in the side walls 31 of the scarifier body. As will be seen from FIG. 7, the orientation of the collecting box when mounted on the scarifier is tilted anticlockwise from that shown in FIG. 1 so that the bottom wall 7 is approximately horizontal. It will be seen that the bottom wall 7 is formed with a front lip 23 (FIGS. 1 and 2) which serves to retain material collected in the box.

When the collecting box 29 is full, it can readily be removed from the tool to be emptied. To this end, it will be noted that the portions of the long ends 21 of the tubes extending between the openings 14 of the box body are surrounded by free space and provide handles 42 by which a user can grasp the box.

The tubes 18 are subjected to relatively high stresses when they engage with the body of the tool and are designed to bear such stresses. Since the tubes are in contact with the box body 1 over a substantial part of their length the relatively high stresses in the tubes result in only low stresses in the box body 1. During removal of the collecting box 29, when full, the tubes 18 may again be subjected to relatively high stresses in this case also, although only low stresses will be transmitted to any part of the box body 1.

Because the box body 1 is sheltered from the high stresses it can be made of relatively thin material. For example a box body made of polpropylene may have an average thickness of about 2 to 3 mm. The collecting box can therefore be lightweight and yet able to withstand rugged use.

It will be understood that alternative arrangements may be employed to fasten the collecting box to the tool body 30 and the projecting ends of the tubes 18 may be provided with whatever kind of fastener is required for this purpose.

Collecting boxes of the kind shown in the drawings can be stacked one within another which facilitates handling and storage of a number of boxes.

What is claimed is:

1. A collecting box for a garden tool, comprising;
    a body of the collecting box, the body being selfsupporting;
    a pair of fastening members, one for each side of said body, said fastening members being attached or attachable to said body;
    said fastening members being arranged to extend along the sides of said body;
    channels provided on the sides of said body to receive said fastening members;
    each fastening member being in the form of a tube; and
    the respective channel being interrupted or diverted between its ends to provide a free space around a portion of the tube to allow the tube to be gripped as a handle.

2. A collecting box as claimed in claim 1, in which the fastening members are arranged to extend at least two thirds of the way along the tops of the sides of the collecting box body.

3. A collecting box as claimed in claim 2, in which the fastening members are arranged to extend substantially the whole of the way along the tops of the sides of the collecting box body.

4. A collecting box as claimed in claim 1, in which the box body is formed by moulding from plastics material and the or each fastening member is made of metal.

5. A collecting box as claimed in claim 1, in which each fastening member is in the form of a tube and the respective channel includes a clip releasably engageable with the tube to retain it in the channel.

6. A collecting box as claimed in claim 5, in which the collecting box body is formed by moulding from plastics material and the clips are formed integrally with the body.

7. A collecting box as claimed in claim 1, in which a flange extends around the top of the side and back walls of the collecting box body and part of the flange forms the said channels.

8. A collecting box for a garden tool, comprising:
a body of the collecting box, the body being selfsupporting;
a pair of fastening members, one for each side of said body, said fastening members being attached or attachable to said body;
said fastening members being arranged to extend along the sides of said body;
channels provided on the sides of said body to receive said fastening members;
each fastening member being in the form of a cranked tube and the respective channel being correspondingly shaped; and
each channel having an opening aligned with a straight portion thereof to permit insertion of a corresponding portion of the respective tube and subsequent rotation of the tube to locate the cranked portion of the tube in the channel.

9. A collecting box for a garden tool in which the body of the box is self-supporting, and at least one frame member located in a channel of the box body, the channel of the box body being interrupted or diverted between its ends to provide a free space around the frame member allowing the frame member to be gripped as a handle.

10. A collecting box as claimed in claim 9, in which the frame member also comprises means for fastening the box to a garden tool.

11. A collecting box as claimed in claim 10, in which at least one end of the frame member projects from the body for fastening the box to the tool.

12. A collecting box for a garden tool, comprising, a lightweight, self-supporting collecting box body, a channel formed along the top of each side of the body, and a respective tubular member, locatable in each channel with the end of the tubular member projecting from the body for fastening the box to a garden tool, each channel being interrupted or diverted between its ends to provide a free space around the tubular member to allow the tubular member to be gripped as a handle.

13. A garden tool including a collecting box as claimed in claim 12, the tool being provided with a pair of sockets for receiving the projecting ends of the tubular members.

14. A collecting box for a garden tool, comprising:
a collecting box body having opposed side walls;
said side walls having tops which extend along opposite sides of an opening into said body;
down-turned flanges along said tops forming channels;
each flange being diverted for part of its length away from the top of the respective side wall towards a bottom of that side wall to form a recess, each such recess being located partway along the respective side wall;
an elongate member located in each channel and having an end extending from said body for mounting said collecting box on the garden tool; and
said members emerging from said channels and extending in line with the tops of said side walls across said recesses to form handles by which the collecting box can be held and lifted;
whereby high stresses that occur during use of the collecting box on the garden tool, during removal of the collecting box when full from the garden tool and during carrying of the full collecting box to empty the latter, are concentrated in said members and only low stresses are transmitted to any part of said collecting box body.

15. The collecting box of claim 14, wherein each said flange has two holes therein, one on each side of the respective recess, and said members extend through said holes to form said handles.

16. The collecting box of claim 15, wherein said collecting box body is molded from plastic material, and said members comprise metal tubes.

17. A collecting box for a garden tool, comprising:
a collecting box body molded from plastic material and having channels extending along opposite sides thereof;
recesses in said sides;
each channel having a pair of spaced apart openings therein intermediate ends of that channel and communicating with one of said recesses;
elongate support members disposed in said channels and having ends protruding therefrom for mounting the collecting box on the garden tool;
said support members each extending through a said pair of openings across the respective recess to form handles in said sides;
said support members having cranked portions and said channels having corresponding cranked portions;
said cranked portions of said support members being disposed between said recesses and said extending ends;
said channels having further openings therein adjacent the cranked portions thereof to enable said support members to be passed through said openings communicating with said recesses and then rotated to engage the cranked portions of said support members in the corresponding cranked portions of said channels; and
resilient clips in said channels between the cranked portions of said channels and said protruding ends of said support members to retain the cranked portions of said support members in said channel cranked portions after said support members are rotated.

18. The collecting box of claim 17, further comprising transverse walls across said channels adjacent ends of said support members opposite to said protruding ends.

19. The collecting box of claim 17, wherein said plastic material comprises polypropylene, an average thickness of said polypropylene is 2 to 3 cm., and said support members comprise aluminum tubes.

20. The collecting box of claim 17, wherein:
said channels are formed by a peripheral flange extending around three edges of an open top of said body;
said flange is diverted away from said top to define said recesses;
said openings communicating with said recesses are located in upper wall portions of the diverted flange; and
said further openings are located in side wall portions of said flange.

* * * * *